US012709473B2

(12) United States Patent
Stuhaug

(10) Patent No.: US 12,709,473 B2
(45) Date of Patent: Aug. 18, 2026

(54) SYSTEM, METHOD AND COMPUTER PROGRAM PRODUCT OF DETERMINING A POSITION OF A CONTAINER HANDLING VEHICLE IN AN AUTOMATED GRID BASED STORAGE AND RETRIEVAL SYSTEM

(71) Applicant: Autostore Technology AS, Nedre Vats (NO)

(72) Inventor: Ragnar Stuhaug, Skjold (NO)

(73) Assignee: AutoStore Technology AS, Nedre Vats (NO)

( * ) Notice: Subject to any disclaimer, the term of this patent is extended or adjusted under 35 U.S.C. 154(b) by 352 days.

(21) Appl. No.: 18/574,270

(22) PCT Filed: Jun. 20, 2022

(86) PCT No.: PCT/EP2022/066685

§ 371 (c)(1),
(2) Date: Dec. 26, 2023

(87) PCT Pub. No.: WO2023/274765

PCT Pub. Date: Jan. 5, 2023

(65) Prior Publication Data

US 2024/0351783 A1 Oct. 24, 2024

(30) Foreign Application Priority Data

Jun. 30, 2021 (NO) .................................. 20210846

(51) Int. Cl.
*G06Q 10/08* (2024.01)
*B65G 1/04* (2006.01)
(Continued)

(52) U.S. Cl.
CPC .......... *B65G 1/0464* (2013.01); *B65G 1/065* (2013.01); *B65G 1/1371* (2013.01); *G06Q 10/08* (2013.01)

(58) Field of Classification Search
CPC .... B65G 1/0464; B65G 1/065; B65G 1/1371; B65G 1/04; G06Q 10/08
See application file for complete search history.

(56) References Cited

U.S. PATENT DOCUMENTS

2021/0155407 A1 5/2021 Austrheim et al.
2022/0388772 A1 12/2022 Hatteland

FOREIGN PATENT DOCUMENTS

CN 102180326 A 9/2011
CN 106570666 A 4/2017
(Continued)

OTHER PUBLICATIONS

Schneider, Marc, Communication in European Patent Office application 22733176.6, mailed Nov. 27, 2025, 6 pages, pub. by European Patent Office, Munich, Germany.
(Continued)

*Primary Examiner* — Justin Holmes
(74) *Attorney, Agent, or Firm* — Baker Botts L.L.P.

(57) ABSTRACT

An automated grid-based storage and retrieval system includes a framework structure, storage containers, a vehicle, and a control system. The structure includes upright members and a rail system of a grid of horizontal rails at upper ends of members and defines a storage volume of adjacent storage columns below the rails. The grid defines grid positions. The containers are stacked in the columns. The vehicle includes a lifting device that can be lowered. The control system records, for each position, a coordinate and the level of containers of that position. A method includes, for a grid position, determining a level of containers in the stack by lowering the lifting device of a first vehicle until detecting a container at a vertical position and (Continued)

determining a grid position of the first vehicle by matching the vertical position with a record of a position of the same level of containers.

15 Claims, 8 Drawing Sheets

(51) Int. Cl.
*B65G 1/06* (2006.01)
*B65G 1/137* (2006.01)

(56) References Cited

FOREIGN PATENT DOCUMENTS

| | | | | | |
|---|---|---|---|---|---|
| CN | 108137229 | A | * | 6/2018 | ........... B65G 1/0464 |
| CN | 109165778 | A | | 1/2019 | |
| CN | 110809553 | A | | 2/2020 | |
| CN | 111795701 | A | | 10/2020 | |
| CN | 112124839 | A | | 12/2020 | |
| NO | 317366 | B1 | | 10/2004 | |
| NO | 20180409 | A1 | | 9/2019 | |
| NO | 20181647 | A1 | | 12/2019 | |
| WO | 2014/075937 | A1 | | 5/2014 | |
| WO | 2014/090684 | A1 | | 6/2014 | |
| WO | 2015/193278 | A1 | | 12/2015 | |
| WO | 2018/146304 | A1 | | 8/2018 | |
| WO | WO-2019068778 | A1 | * | 4/2019 | ............. G06Q 10/04 |
| WO | 2019/170805 | A1 | | 9/2019 | |
| WO | 2019/206487 | A1 | | 10/2019 | |
| WO | 2019238703 | A1 | | 12/2019 | |
| WO | 2021099474 | A1 | | 5/2021 | |

OTHER PUBLICATIONS

Wang, Yanfang, Examining action in Chinese patent application 202280046459.8, mailed Jan. 1, 2026, 12 pages, pub. by The State Intellectual Property Office of the People's Republic of China, Beijing, China.
International Search Report issued in PCT/EP2022/066685 on Sep. 27, 2022 (4 pages).
Written Opinion of the International Searching Authority issued in PCT/EP2022/066685 on Sep. 27, 2022 (10 pages).
Norwegian Search Report issued in No. 20210846 mailed on Jan. 21, 2022 (2 pages).

* cited by examiner

SYSTEM, METHOD AND COMPUTER PROGRAM PRODUCT OF DETERMINING A POSITION OF A CONTAINER HANDLING VEHICLE IN AN AUTOMATED GRID BASED STORAGE AND RETRIEVAL SYSTEM

The present invention relates to an automated storage and retrieval system for storage and retrieval of containers, in particular to a system and method of determining a position of a container handling vehicle in the automated storage and retrieval system.

BACKGROUND AND PRIOR ART

FIG. 1 discloses a typical prior art automated storage and retrieval system 1 with a framework structure 100 and FIGS. 2, 3 and 4 disclose three different prior art container handling vehicles 201, 301, 401 suitable for operating on such a system 1.

The framework structure 100 comprises upright members 102 and a storage volume comprising storage columns 105 arranged in rows between the upright members 102. In these storage columns 105 storage containers 106, also known as bins, are stacked one on top of one another to form stacks 107. The members 102 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301, 401 may be operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201, 301, 401 in a first direction X across the top of the frame structure 100, and a second set of parallel rails 111 arranged perpendicular to the first set of rails 110 to guide movement of the container handling vehicles 201, 301, 401 in a second direction Y which is perpendicular to the first direction X. Containers 106 stored in the columns 105 are accessed by the container handling vehicles 201, 301, 401 through access openings 112 in the rail system 108. The container handling vehicles 201, 301, 401 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201, 301, 401 comprises a vehicle body 201*a*, 301*a*, 401*a* and first and second sets of wheels 201*b*, 201*c*, 301*b*, 301*c*, 401*b*, 401*c* which enable the lateral movement of the container handling vehicles 201, 301, 401 in the X direction and in the Y direction, respectively. In FIGS. 2, 3 and 4 two wheels in each set are fully visible. The first set of wheels 201*b*, 301*b*, 401*b* is arranged to engage with two adjacent rails of the first set 110 of rails, and the second set of wheels 201*c*, 301*c*, 401*c* is arranged to engage with two adjacent rails of the second set 111 of rails. At least one of the sets of wheels 201*b*, 201*c*, 301*b*, 301*c*, 401*b*, 401*c* can be lifted and lowered, so that the first set of wheels 201*b*, 301*b*, 401*b* and/or the second set of wheels 201*c*, 301*c*, 401*c* can be engaged with the respective set of rails 110, 111 at any one time.

Each prior art container handling vehicle 201, 301, 401 also comprises a lifting device for vertical transportation of storage containers 106, e.g. raising a storage container 106 from, and lowering a storage container 106 into, a storage column 105. The lifting device comprises one or more gripping/engaging device which is adapted to engage a storage container 106, and which gripping/engaging device can be lowered from the vehicle 201, 301, 401 so that the position of the gripping/engaging device with respect to the vehicle 201, 301, 401 can be adjusted in a third direction Z which is orthogonal the first direction X and the second direction Y. Parts of the gripping device of the container handling vehicles 301, 401 are shown in FIGS. 3 and 4 indicated with reference number 304, 404. The gripping device of the container handling device 201 is located within the vehicle body 201*a* in FIG. 2.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=17, Y=1, Z=6. The container handling vehicles 201, 301, 401 can be said to travel in layer Z=0, and each storage column 105 can be identified by its X and Y coordinates. Thus, the storage containers shown in FIG. 1 extending above the rail system 108 are also said to be arranged in layer Z=0.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X–, Y- and Z-direction.

Each prior art container handling vehicle 201, 301, 401 comprises a storage compartment or space for receiving and stowing a storage container 106 when transporting the storage container 106 across the rail system 108. The storage space may comprise a cavity arranged internally within the vehicle body 201*a* as shown in FIGS. 2 and 4 and as described in e.g. WO2015/193278A1 and WO2019/206487A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the cavity container handling vehicles 401 may instead have a footprint which is larger than the lateral area defined by a storage column 105 as shown in FIGS. 1 and 4, e.g. as is disclosed in WO2014/090684A1 or WO2019/206487A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks. In other rail systems 108, each rail in one direction (e.g. an X direction) may comprise one track and each rail in the other, perpendicular direction (e.g. a Y direction) may comprise two tracks. Each rail 110, 111 may also comprise two track members that are fastened together, each track member providing one of a pair of tracks provided by each rail.

WO2018/146304A1, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201, 301, 401 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119, 120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119, 120 for further transportation to an access station. Note that the term 'tilted' means transportation of storage containers 106 having a general transportation orientation somewhere between horizontal and vertical.

In FIG. 1, the first port column 119 may for example be a drop-off port column where the container handling vehicles 201, 301 can drop off storage containers 106 to be transported to an access or a transfer station, and the second port column 120 may be a dedicated pick-up port column where the container handling vehicles 201, 301, 401 can pick up storage containers 106 that have been transported from an access or a transfer station (not shown).

The access station may typically be a picking or a stocking station where product items are removed from or positioned into the storage containers 106. In a picking or a stocking station, the storage containers 106 are normally not removed from the automated storage and retrieval system 1, but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119, 120 and the access station.

If the port columns 119, 120 and the access station are located at different levels, the conveyor system may comprise a lift with a vertical component for transporting the storage containers 106 vertically between the port column 119, 120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201, 301, 401 is instructed to retrieve the target storage container 106 from its position and transport it to the drop-off port column 119. This operation involves moving the container handling vehicle 201, 301 to a location above the storage column 105 in which the target storage container 106 is positioned, retrieving the storage container 106 from the storage column 105 using the container handling vehicle's 201, 301, 401 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles 201, 301, 401 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201, 301, 401 is instructed to pick up the storage container 106 from the pick-up port column 120 and transport it to a location above the storage column 105 where it is to be stored. After any storage containers 106 positioned at or above the target position within the stack 107 have been removed, the container handling vehicle 201, 301, 401 positions the storage container 106 at the desired position. The removed storage containers 106 may then be lowered back into the storage column 105, or relocated to other storage columns 105.

For monitoring and controlling the automated storage and retrieval system 1, e.g. monitoring and controlling the location of respective storage containers 106 within the framework structure 100, the content of each storage container 106; and the movement of the container handling vehicles 201, 301, 401 so that a desired storage container 106 can be delivered to the desired location at the desired time without the container handling vehicles 201, 301, 401 colliding with each other, the automated storage and retrieval system 1 comprises a control system 121 which typically is computerized and which typically comprises a database for keeping track of the storage containers 106.

A container handling vehicle 201, 301, 401 may lose its position on the rail system 108 and will be unable to report its position to the control system 121. This could create a situation where other container handling vehicles 201, 301, 401 may collide with the lost container handling vehicle. If such situations occurred, the entire the automated storage and retrieval system 1 would have to be shut down, and human operators would need to enter the rail system 108 to locate the lost container handling vehicle and restart the system.

There is a need for a solution that allows the system to automatically determine the position of a lost container handling vehicle 201, 301, 401 on the rail system 108.

In view of the above it is desirable to provide an automated storage and retrieval system, and a method of operating such as system, that solves or at least mitigates one or more of the aforementioned problems related to use of prior art storage and retrieval systems.

SUMMARY OF THE INVENTION

The present invention is set forth and characterized in the independent claims, while the dependent claims describe other characteristics of the invention.

In a first aspect, the invention is related to a method of determining a position of a container handling vehicle on a rail system of an automated grid based storage and retrieval system, the automated grid based storage and retrieval system comprising

- a framework structure comprising upright members and a rail system comprising a grid of horizontal rails provided at upper ends of the upright members, the framework structure defining a storage volume comprising storage columns arranged adjacent one another below the horizontal rails, the grid defining a plurality of grid positions,
- a plurality of storage containers stacked on top of one another in the storage columns to form a plurality of stacks in the storage columns,
- a container handling vehicle comprising a lifting device which can be lowered from the container handling vehicle for picking up a storage container,
- a control system comprising records of, for each grid position comprising a stack of storage containers, a grid coordinate and a level of the storage containers in the stack of the storage column corresponding to that grid position, wherein
- for at least one grid position, determining a level of the storage containers in the stack by lowering the lifting device of a first container handling vehicle until a storage container is detected at a vertical position by the lifting device, and
- determining, using the control system, a grid position of the first container handling vehicle through matching the detected vertical position with a record of a grid position having the same level of storage containers in a stack.

An advantage of first aspect of the invention is that the position of a lost container handling vehicle on the rail system may be determined automatically by the system without human intervention.

In one embodiment, the method may comprise determining the vertical position when the lifting device is holding a storage container.

In one embodiment, the method may further comprise lowering the lifting device at a first speed until a first vertical position is reached, and lowering the lifting device at a second speed that is slower than the first speed when determining the level of the storage containers in the stack.

In one embodiment, the first vertical position may be determined based on an expected maximum level of storage containers for an expected grid position.

In one embodiment, the method may comprise instructing a second container handling vehicle to move storage containers from or to a grid position to create a unique level of storage containers at the grid position. The grid position of the first container handling vehicle may be determined when the lifting device of the first container handling vehicle is lowered to detect the unique level of storage containers set by the second container handling vehicle.

In one embodiment, the method may comprise updating the records of the control system with the determined grid position of the first container handling vehicle.

In a second aspect, the invention is related to a system of determining a grid position of a container handling vehicle on a rail system of an automated grid based storage and retrieval system, the automated grid based storage and retrieval system comprising

- a framework structure comprising upright members and a rail system comprising a grid of horizontal rails provided at upper ends of the upright members, the framework structure defining a storage volume comprising storage columns arranged adjacent one another below the horizontal rails, the grid defining a plurality of grid positions,
- a plurality of storage containers stacked on top of one another in the storage columns to form a plurality of stacks in the storage columns,
- a plurality of container handling vehicles comprising a lifting device which can be lowered from the container handling vehicle for picking up a storage container,
- a control system comprising records of, for each grid position comprising a stack of storage containers, a grid coordinate and a level of the storage containers in the stack of the storage column corresponding to that grid position, and the system is adapted to
- for at least one grid position, determine a level of the storage containers in the stack by lowering the lifting device of a first container handling vehicle until a storage container is detected at a vertical position by the lifting device, and
- determining, using the control system, grid position of the first container handling vehicle through matching the detected vertical position with a record of a grid position having the same level of storage containers in a stack.

In one embodiment, the system may be adapted to detect the vertical position when the lifting device is holding a storage container.

In one embodiment, the system may be further adapted to lower the lifting device at a first speed until a first vertical position is reached, and lowering the lifting device at a second speed that is slower than the first speed when determining the level of the storage containers in the stack.

In one embodiment, the first vertical position may be determined based on an expected maximum level of storage containers for an expected grid position.

In one embodiment, the control system may be is further adapted to instruct a second container handling vehicle to move storage containers from or to a grid position to create a unique level of storage containers at the grid position.

In one embodiment, the grid position of the first container handling vehicle is determined when the lifting device of the first container handling vehicle is lowered to detect the unique level of storage containers set by the second container handling vehicle. The control system may be further adapted to update the records of the control system with the determined grid position of the first container handling vehicle.

In a third aspect, the invention is related to a computer program product for a control system 121, wherein the computer program product comprising instructions that when performed on the control system 121 performs the method according to the first aspect of the invention.

BRIEF DESCRIPTION OF THE DRAWINGS

Following drawings are appended to facilitate the understanding of the invention. The drawings show embodiments of the invention, which will now be described by way of example only, where.

DETAILED DESCRIPTION OF THE INVENTION

Figure 1:
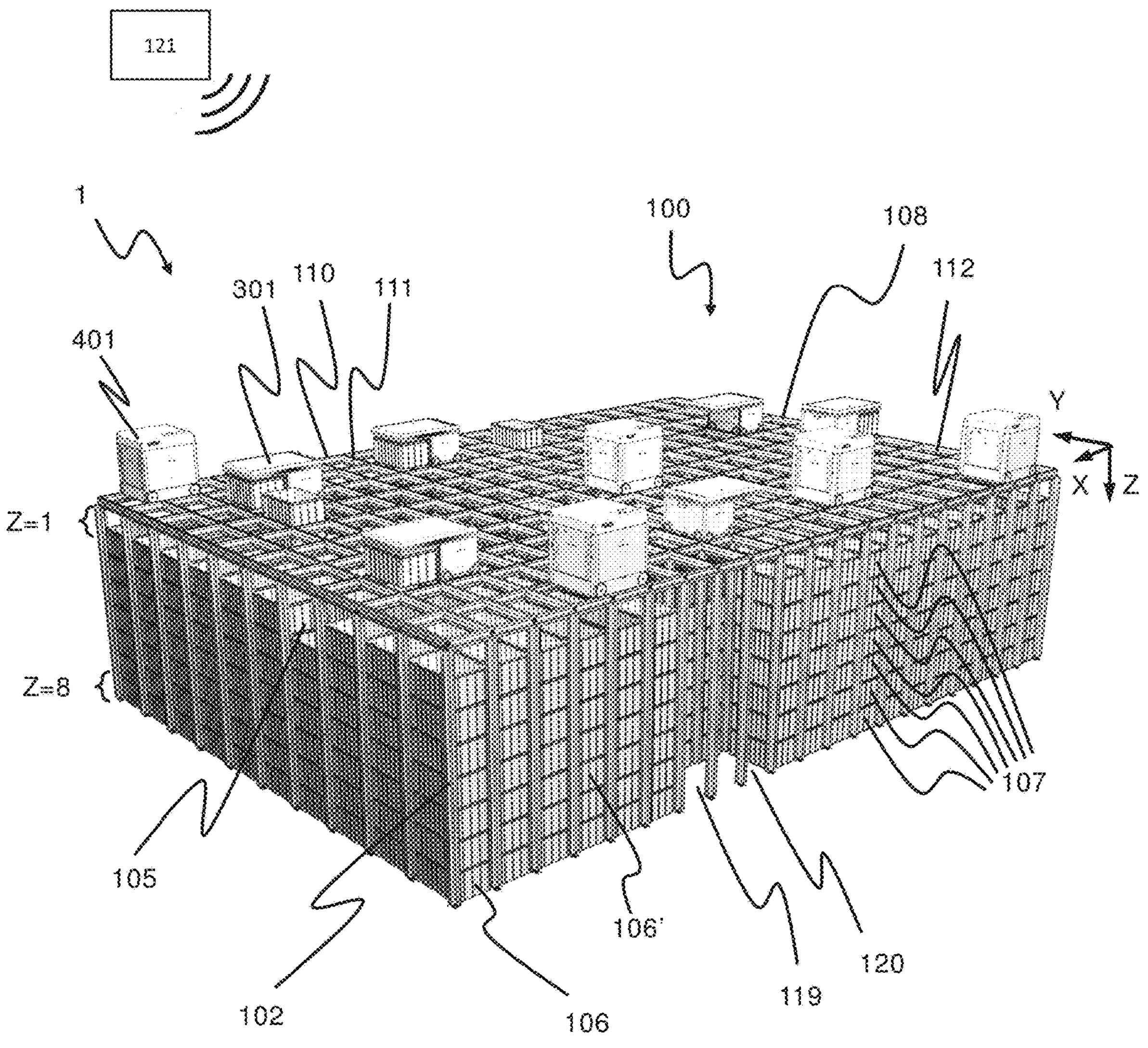
FIG. 1 is a perspective view of a framework structure of an automated storage and retrieval system.
Figure 2:
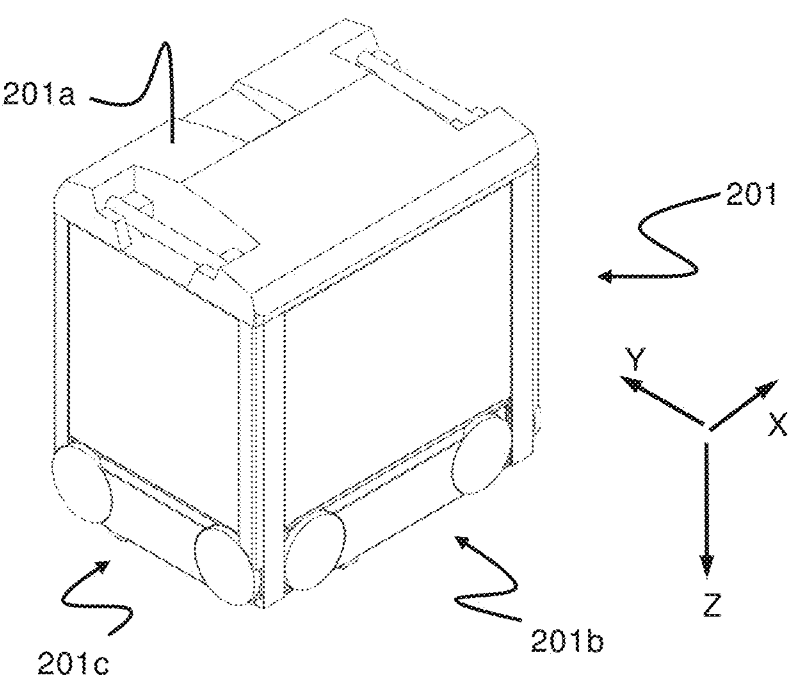
FIG. 2 is a perspective view of a prior art container handling vehicle having an internally arranged cavity for carrying storage containers therein.
Figure 3:
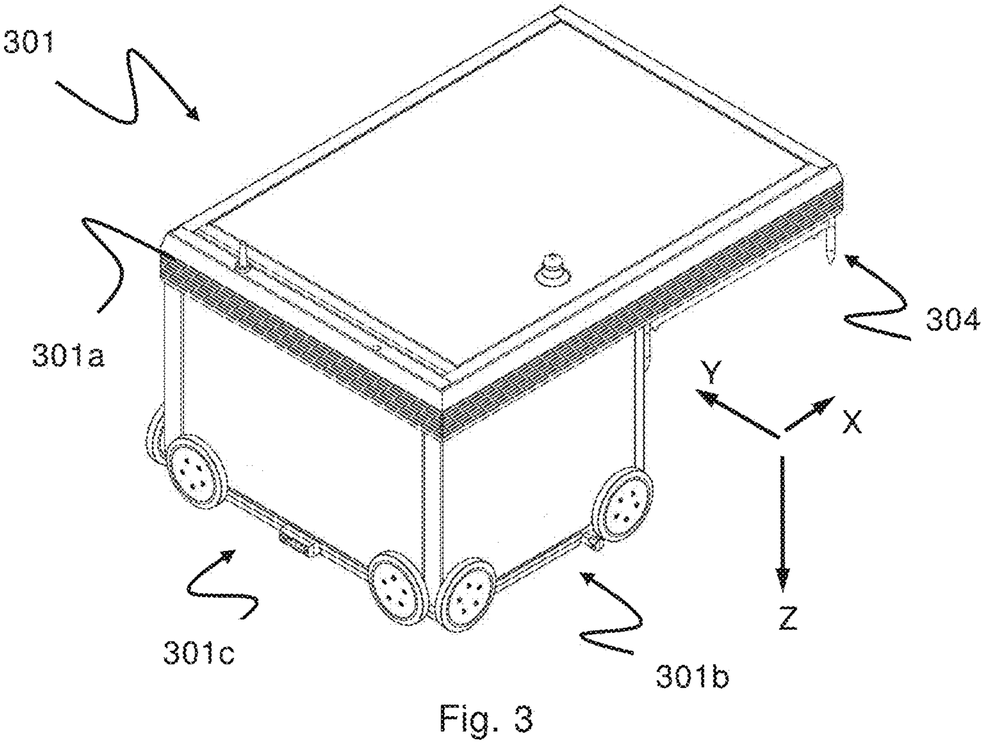
FIG. 3 is a perspective view of a prior art container handling vehicle having a cantilever for carrying storage containers underneath.
Figure 4:
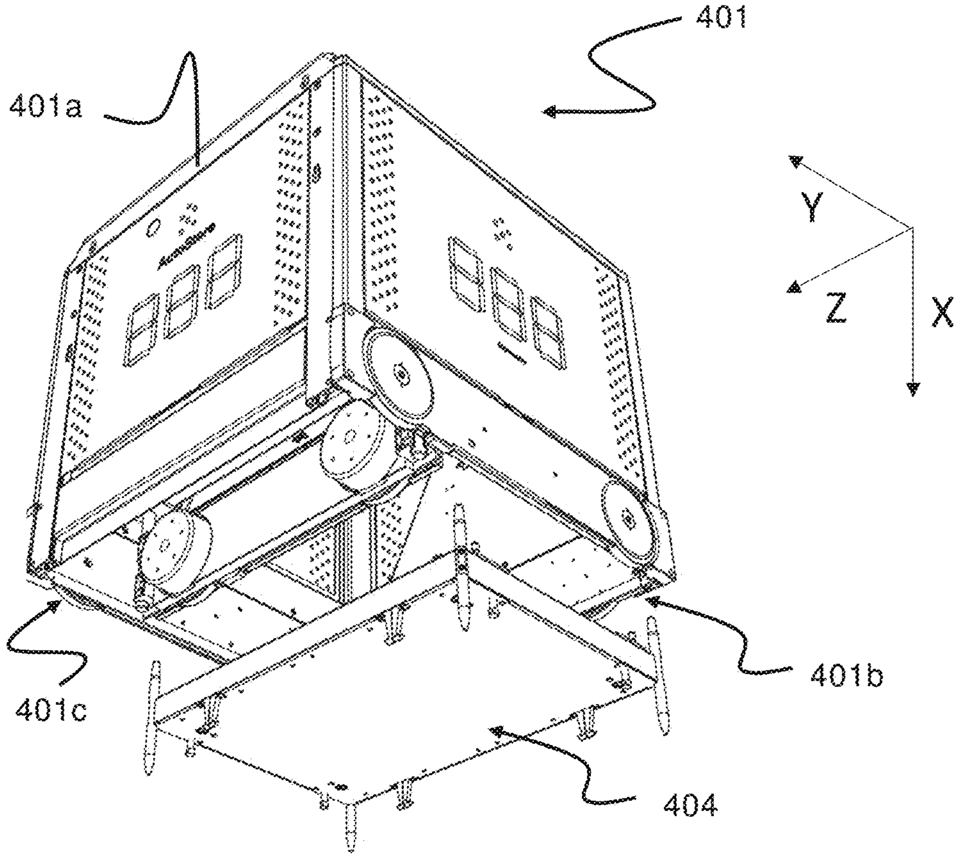
FIG. 4 is a perspective view of a prior art container handling vehicle having a lifting device for carrying storage containers in an internally arranged cavity.

In the following, embodiments of the invention will be discussed in more detail with reference to the appended drawings. It should be understood, however, that the drawings are not intended to limit the invention to the subject-matter depicted in the drawings.

The framework structure 100 of the automated storage and retrieval system 1 is constructed in accordance with the prior art framework structure 100 described above in connection with FIGS. 1-4, i.e. a number of upright members 102, and further that the framework structure 100 comprises a first, upper rail system 108 in the X direction and Y direction.

The framework structure 100 further comprises storage compartments in the form of storage columns 105 provided between the members 102, where storage containers 106 are stackable in stacks 107 within the storage columns 105.

The framework structure 100 can be of any size. In particular, it is understood that the framework structure can be considerably wider and/or longer and/or deeper than disclosed in FIG. 1. For example, the framework structure 100 may have a horizontal extent of more than 700×700 columns and a storage depth of more than twelve containers.

One embodiment of the automated storage and retrieval system according to the invention will now be discussed in more detail with reference to FIGS. 5-9.

Figure 5:
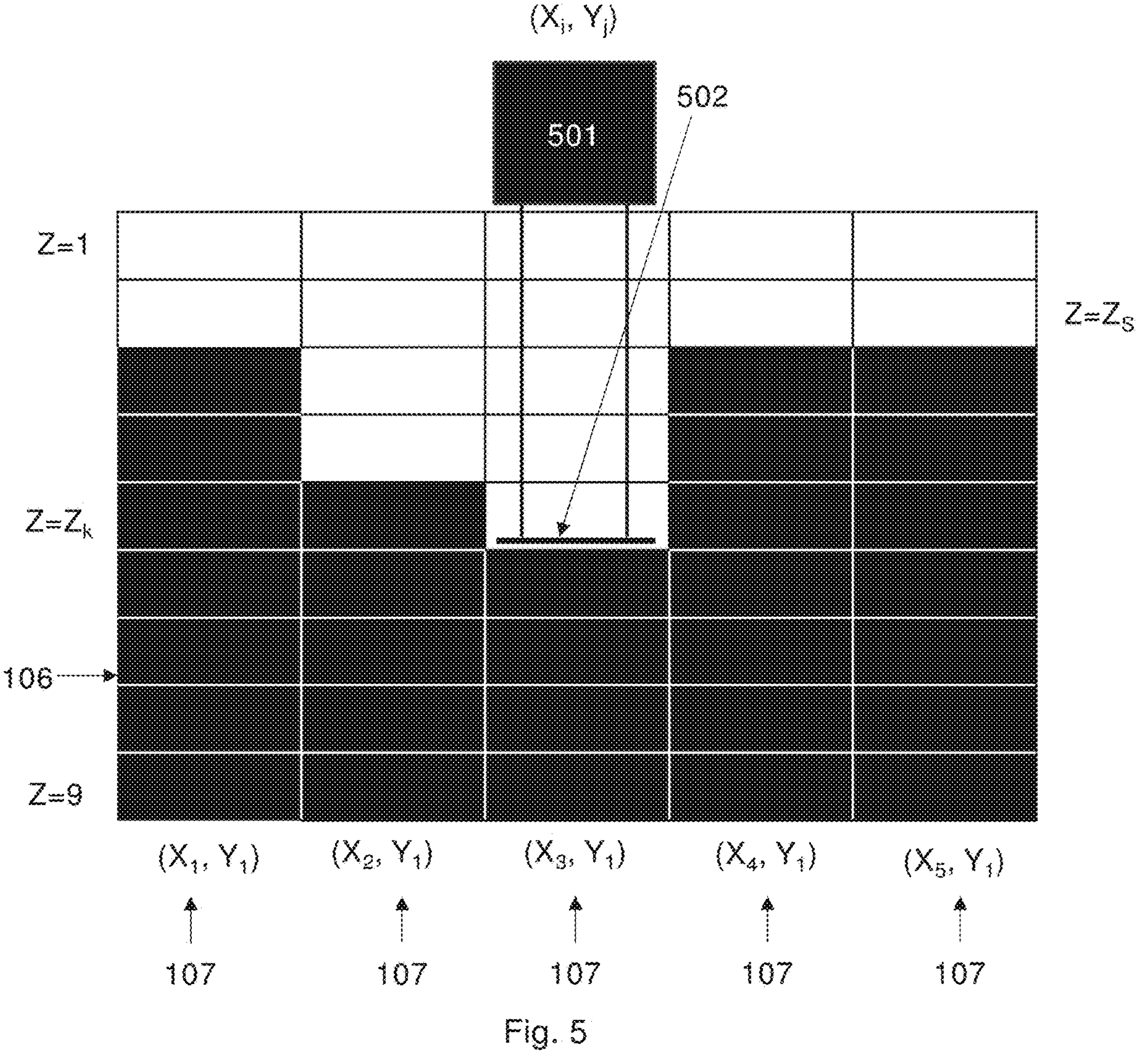
FIG. 5 is a side view of an exemplary automated storage and retrieval system according to an embodiment of the present invention.

FIG. 5 illustrates a plurality of storage containers 106 stacked one on top of one another in the storage columns 105 to form a plurality of stacks 107 in the storage columns. The first container handling vehicle 501, which may be of any of the types of container handling vehicles 201, 301, 401 described above, comprising a lifting device 502 which can be lowered from the first container handling vehicle 501 for picking up a storage container 106. The control system 121 keeps a record for each of the plurality of stacks 107 comprising a grid position ($X_i$, $Y_j$) of the stack 107 (using a coordinate system based on the grid cells of the grid-based rail system 108) and a value indicative of how many storage containers 106 are in the stack 107 or how many storage containers can still be stored in the stack, e.g., the number of levels that are available.

The value may be a measure of the level of the storage containers, an amount or number of the storage containers, a height of the stacked containers, an amount or number of the available free spaces for containers in the stack or a depth of that free space. The term "level" used herein can be used interchangeably in the discussion that follows with any of these measures, for example, whether the level is measured in units of storage containers, absolute heights from a base reference level indicating the bottom of the stack, available levels or available storage height, or in some other way.

The control system 121 may keep the record of the grid position ($X_i$, $Y_j$) of each stack 107 on the rail system 108 and the level of storage containers 106 in the stack 107 for each of the stacks in a database, for example, stored in a writable drive or other storage of the computer system.

In the figure, the first container handling vehicle 501 has an unknown grid position ($X_i$, $Y_j$) on the rail system 108. The first container handling vehicle 501 is adapted to, for at least one grid position ($X_i$, $Y_j$) on the rail system 108, determine a level of the stack 107 within the storage column, e.g., by contact with a storage container 106 at a top of a stack at a grid position ($X_i$, $Y_j$), by lowering the lifting device 502 until a storage container is detected in a vertical position $Z_k$ by the lifting device 502.

The control system 121 checks for a grid position ($X_i$, $Y_j$) having the same level of storage containers 106 as the determined level of storage containers 106.

In FIG. 5 there are two stacks having a unique amount of storage containers, ($X_2$, $Y_1$) and ($X_3$, $Y_1$). When, as illustrated in FIG. 5 the control system 121 finds a unique match between the detected vertical position $Z_k$ with a record of a grid position ($X_3$, $Y_1$) having the same level of storage containers 106 in a stack 107, the system has determined the grid position of the container handling vehicle 401 on the rail system 108 as ($X_3$, $Y_1$). The control system 121 updates the records of the control system with the determined coordinates of the first container handling vehicle 501. The control system 121 may also update a memory of the first container handling vehicle 501 with the determined coordinates.

If, on the other hand, the attempt on determining the grid position ($X_i$, $Y_j$) had been at ($X_4$, $Y_1$), there would not have been an unique solution and the control system 121 would instruct the container handling vehicle 401 to move to another grid position ($X_i$, $Y_j$). Then the container handling vehicle 401 determines the level of the storage containers (106) in the stack (107) at the new grid position, and the control system 121 checks again for a grid position ($X_i$, $Y_j$)

having the same level of storage containers 106 as the determined level of storage containers 106 at the new grid position.

When the first container handling vehicle 501 has lost its position, the control system 121 usually have information about the first container handling vehicle's 501 position on the rail system, in what direction the first container handling vehicle was moving, at what speed the first container handling vehicle was moving, at the time some error occurred that caused the first container handling vehicle to lose track of its position on the rail system 108. The first container handling vehicle 501 may also have a log stored in a memory of it position, direction, speed at the time the error occurred that may be uploaded to the control system 121. The control system 121 may use the information about the first container handling vehicle's 501 historical position and movements to make a prediction of the most likely grid position ($X_i$, $Y_j$) of the first container handling vehicle 501.

For the first container handling vehicle 501 to determining the level of the storage containers 106 in the stack 107 by lowering the lifting device 502, the first container handling vehicle 501 aligns with an access opening 112 in the rail system 108. In one embodiment, the control system 121 may instruct the first container handling vehicle 501 to move in a given direction, typically the opposite the direction of what the container handling vehicle 501 was driving when loosing track of its position, until the first container handling vehicle 501 detects that it is within an access opening 112. The first container handling vehicle 501 may comprise sensors to detect rail crossings on the rail system 108 to determine when the first container handling vehicle 501 is withing an access opening 112.

Figure 6:
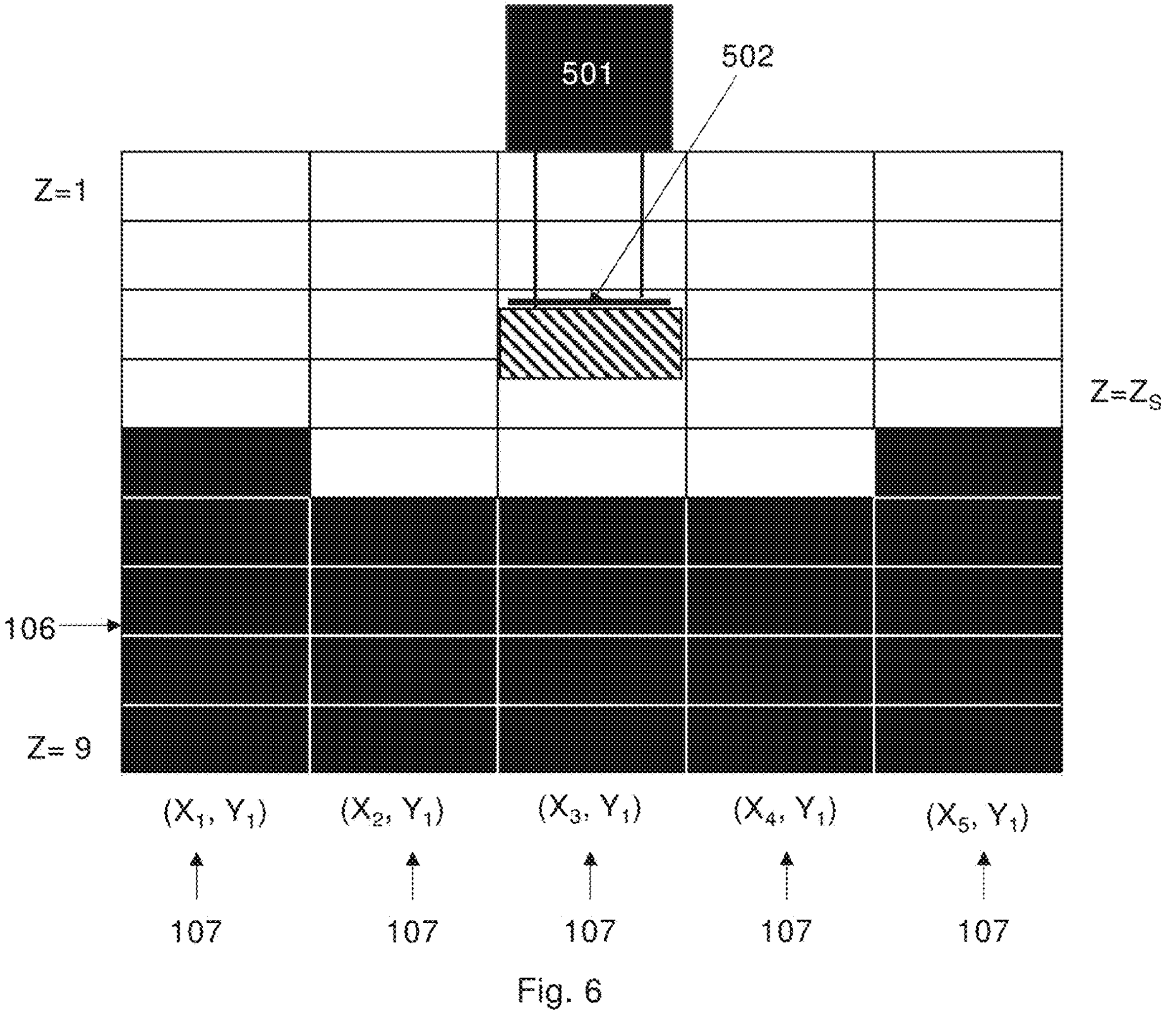
FIG. 6 is a side view of an exemplary automated storage and retrieval system according to an embodiment of the present invention.
Figure 7:
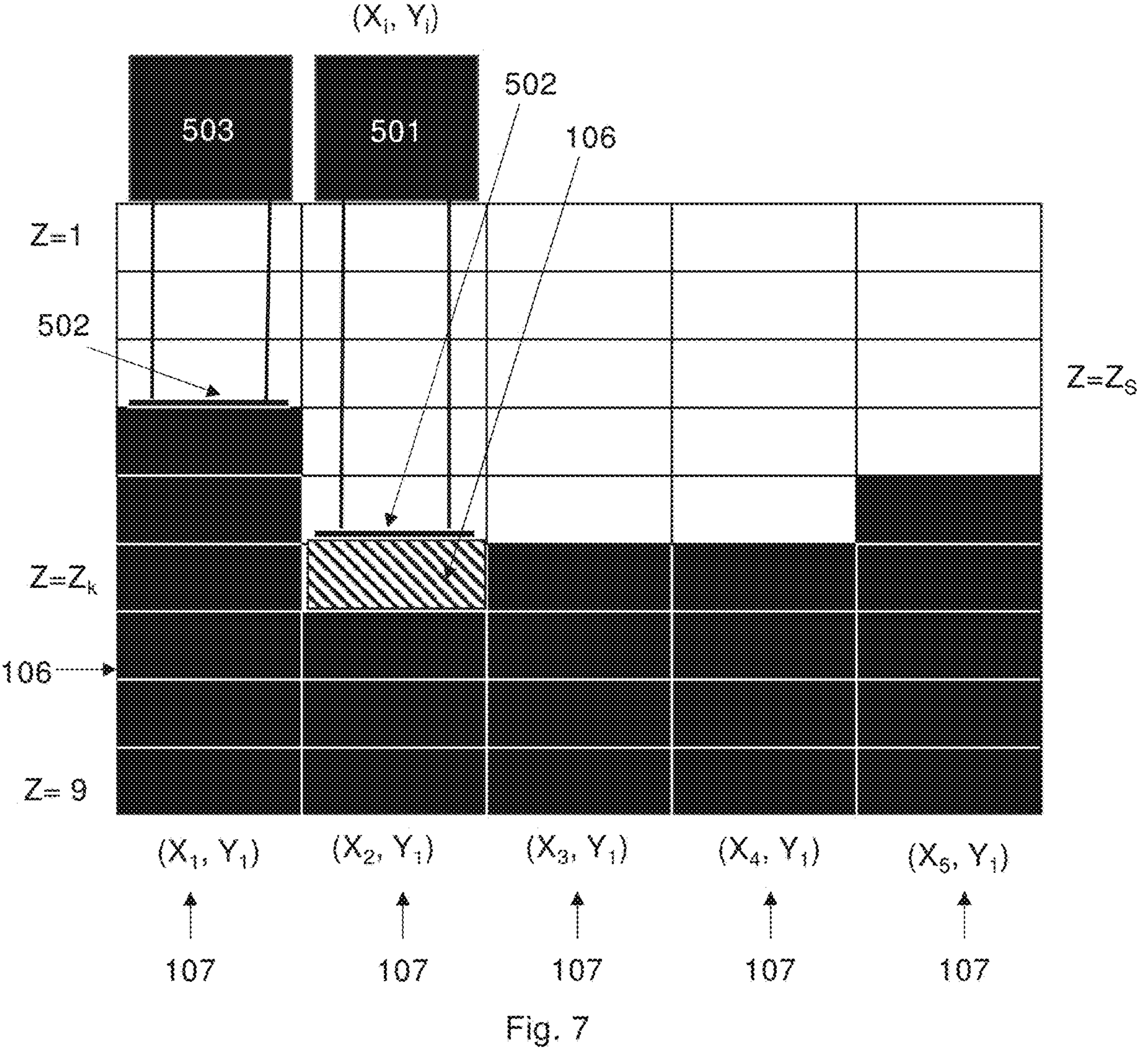
FIG. 7 is a side view of an exemplary automated storage and retrieval system according to an embodiment of the present invention.

The first container handling vehicle 501 may detect the vertical position $Z_k$ through contact by the lifting device 502 by itself such as illustrated in FIG. 5, or while holding a storage container 106 as illustrated in FIG. 6 and FIG. 7, e.g., if the container handling vehicle happened to be carrying a storage container at the time.

In one embodiment, the first container handling vehicle 501 may be adapted to lowering the lifting device 502 at a first speed until a vertical position $Z_S$ is reached, and lowering the lifting device 502 at a second speed that is slower than the first speed, when determining the level of storage containers 106 in the stack 107. In one exemplary embodiment the vertical position $Z_S$ is determined based on an expected maximum level of storage containers for an expected grid position ($X_i$, $Y_j$). This may allow for quickly lowering the lifting device 502 while avoiding the possibility that the lifting device 502 crashes into an upper storage container of a stack with excessive speed, potentially damaging the lifting device 502, the storage container 106 as well as any content in the storage container 106.

FIG. 6 illustrates a situation where none of stacks 107 has a unique level of storage containers 106. In this case, the control system 121 may be adapted to instruct a second container handling vehicle 503, which may be of any of the types of container handling vehicles 201, 301, 401, 501 described above, to move one or more storage containers 106 from or to the grid position ($X_i$, $Y_j$) to obtain an unique level of storage containers 106 a at the grid position ($X_i$, $Y_j$). FIG. 7 illustrates an exemplary situation where one of the storage containers 106 has been moved from ($X_2$, $Y_1$) to ($X_1$, $Y_1$) to create two new unique stacks, ($X_2$, $Y_1$) and ($X_1$, $Y_1$). The control system 121 may as described use the information about the first container handling vehicle's 501 historical position and movements to make a prediction of the most likely grid position ($X_i$, $Y_j$) of the first container handling vehicle 501. The control system 121 may instruct the second container handling vehicle 503 to move one or more storage containers 106 from or to a grid position ($X_i$, $Y_j$) in proximity of the most likely grid position. The records in the control system 121 of, for each grid position ($X_i$, $Y_j$), the grid coordinate ($X_i$, $Y_j$) and the level of the storage containers 106 in the stack 107 of the storage column 105 corresponding to that grid position ($X_i$, $Y_j$) are updated when the second storage container handling vehicle 503 moves the one or more storage containers 106 from or to the grid position ($X_i$, $Y_j$). In one embodiment, the grid position ($X_i$, $Y_j$) of the first container handling vehicle 501 is determined when the lifting device 502 of the first container handling vehicle 501 is lowered to detect the unique level of storage containers 106 set by the second container handling vehicle 503.

Figure 8:
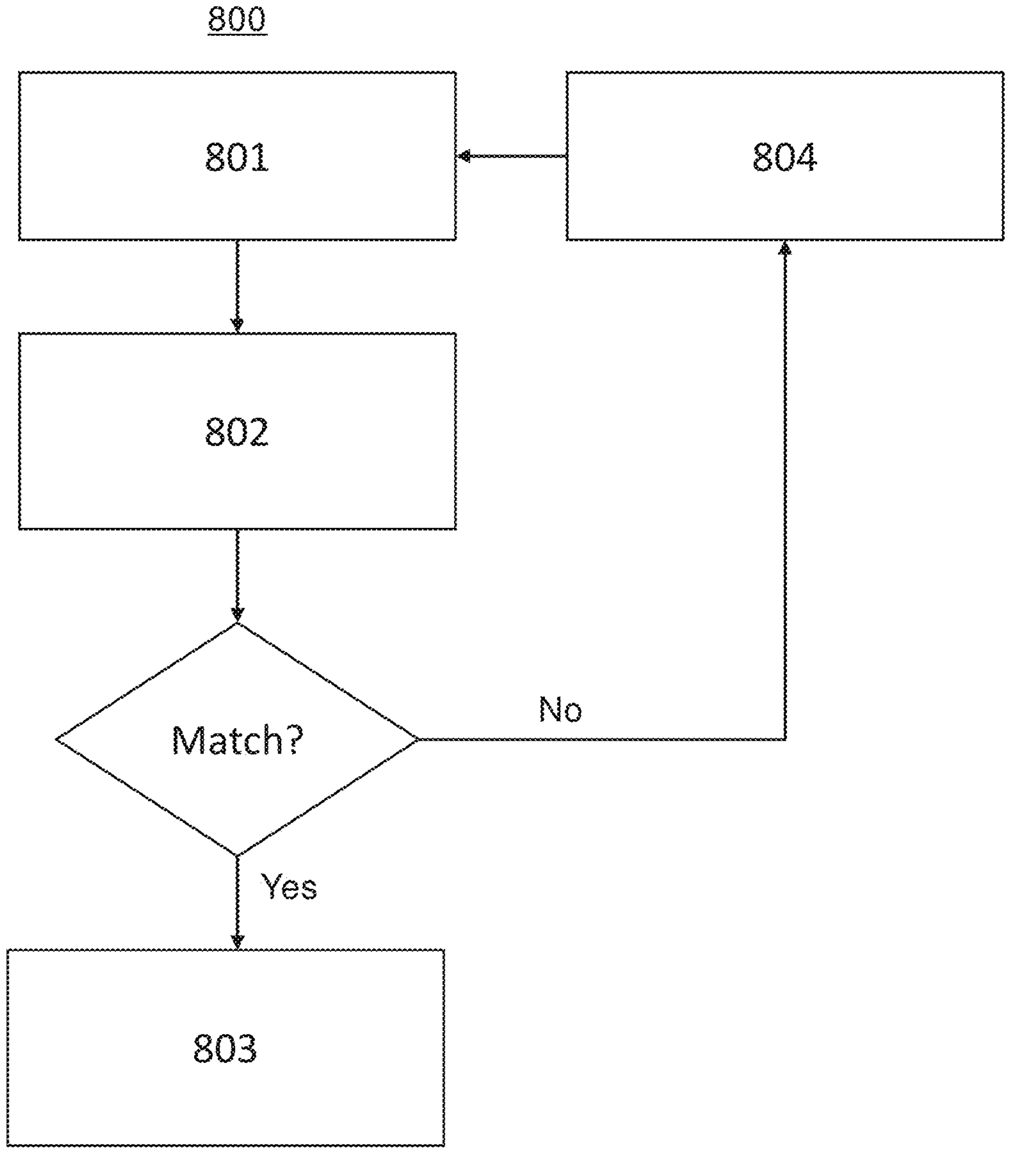
FIG. 8 is an exemplary flow chart according to an embodiment of the present invention.

FIG. 8 illustrates an exemplary flow chart of a method 800 of determining a position of a container handling vehicle 201, 301, 401, 501 on the system of determining a grid position of a container handling vehicle automated grid based storage and retrieval system 1 as described above with reference to FIGS. 5-7. The method 800 starts with step 801 of for at least one grid position ($X_i$, $Y_j$), determining the level of the storage containers 106 in the stack 107 by lowering the lifting device 502 of the first container handling vehicle 501 until a storage container is detected at a vertical position Zk by the lifting device 502. Then, in step 802, it is determined, using the control system 121, a grid position ($X_i$, $Y_j$) of the first container handling vehicle 501 through matching the detected vertical position $Z_k$ with a record of a grid position ($X_i$, $Y_j$) having the same level of storage containers 106 in a stack 107. If a unique matching grid position ($X_i$, $Y_j$) is found, the method continues to step 803, wherein the records of the control system 121 is updated with the determined grid position ($X_i$, $Y_j$) of the first container handling vehicle 501. If no unique matching grid position ($X_i$, $Y_j$) is found, the method continues to step 804, wherein the control system 121 instructs the first container handling vehicle 501 to move to new grid position ($X_i$, $Y_j$). The method 800 then returns to step 801.

The step of determining the vertical position $Z_k$ may be performed when the lifting device 502 is holding a storage container 106, as illustrated in FIG. 6 and FIG. 7, or by the lifting device 502 itself such as illustrated in FIG. 5.

In one embodiment, the method further comprises lowering the lifting device 502 at a first speed until a first vertical position $Z_S$ is reached, and lowering the lifting device 502 at a second speed that is slower than the first speed when determining the level of the storage containers 106 in the stack 107. The first vertical position $Z_S$ may be determined based on an expected maximum level of storage containers 106 for an expected grid position ($X_i$, $Y_j$).

Figure 9:
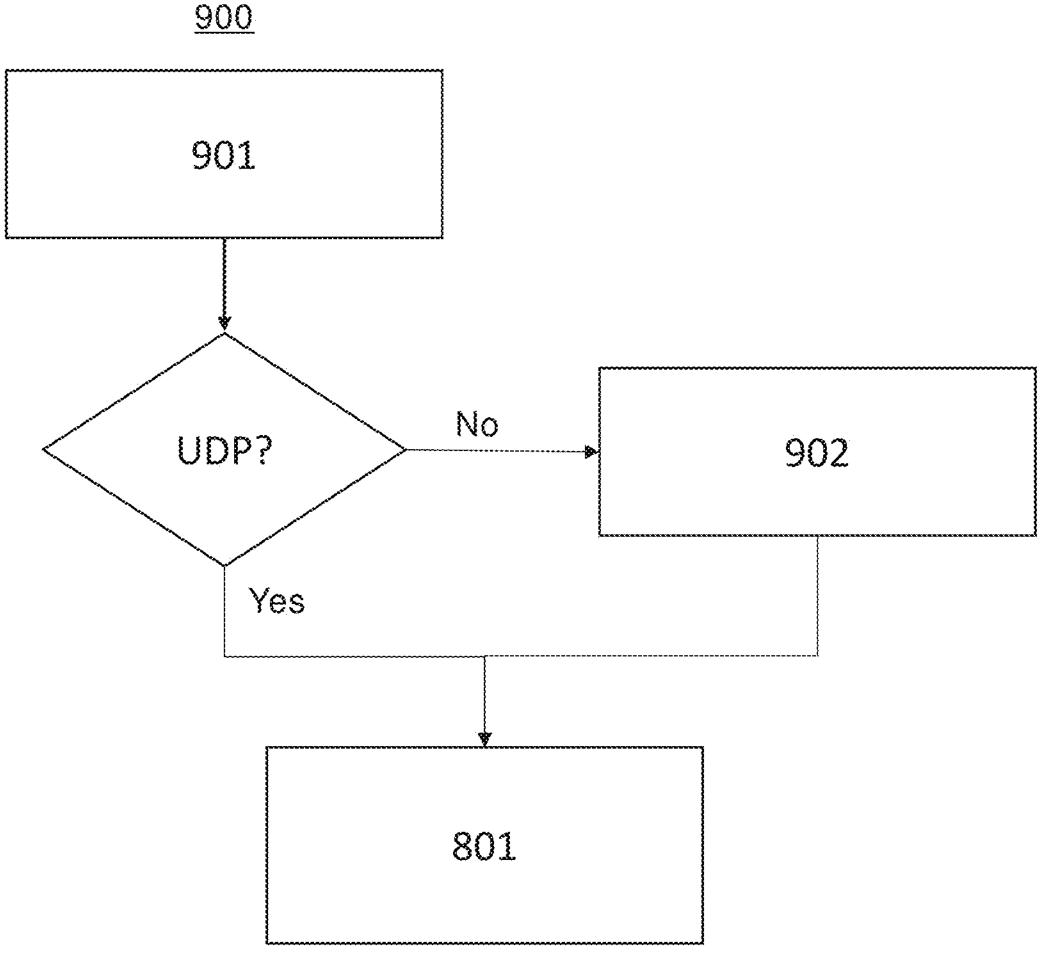
FIG. 9 is an exemplary flow chart according to an embodiment of the present invention.

In some situations, such as illustrated in FIG. 6, none of the stacks 107 has a unique level of storage containers 106. In this case the method 800 cannot determine a grid position ($X_i$, $Y_j$) of the first container handling vehicle 501 through matching the detected vertical position $Z_k$ with a record of a grid position ($X_i$, $Y_j$) having the same level of storage containers 106 in a stack 107. Thus, in one embodiment the method 800 may comprise a method 900 prior to step 801. FIG. 9 illustrates an exemplary flow chart of the method 900. In a first step 901, it is determined, e.g. by reviewing the record for each grid position ($X_i$, $Y_j$) in the control system 121, whether there are any grid position ($X_i$, $Y_j$) having an unique level of storage containers 106 in a stack 107. In some embodiments, a single grid position, or a combination of a plurality of adjacent grid positions, may provide an unique depth pattern (UDP), that may be used to determine the grid position ($X_i$, $Y_j$) of the first container handling vehicle 501. If it is determined that there is an UDP, then the method proceeds to step 801 as described above. If it is determined that there is no UDP, then the method proceeds to step 902. In step 902 a second container handling vehicle 503 is instructed to move storage containers 106 from or to a grid position ($X_i$, $Y_j$) to create a unique level, or UDP, of storage containers 106 at the grid position ($X_i$, $Y_j$). When a unique level, or UDP, of storage containers 106 has been created, the method 900 proceeds to step 801 as described above. In doing so, the grid position ($X_i$, $Y_j$) of the first container handling vehicle 501 is determined when the lifting device 502 of the first container handling vehicle 501 is lowered to detect the unique level of storage containers 106 set by the second container handling vehicle 503.

In the preceding description, various aspects of the delivery vehicle and the automated storage and retrieval system according to the invention have been described with reference to the illustrative embodiment. For purposes of explanation, specific numbers, coordinate system, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the claims.

LIST OF REFERENCE NUMBERS

1 Prior art automated storage and retrieval system
100 Framework structure
102 Upright members of framework structure
104 Storage grid
105 Storage column
106 Storage container
106' Particular position of storage container
107 Stack
108 Rail system
110 Parallel rails in first direction (X)
**110*a*** First rail in first direction (X)
**110*b*** Second rail in first direction (X)
111 Parallel rail in second direction (Y)
**111*a*** First rail of second direction (Y)
**111*b*** Second rail of second direction (Y)
112 Access opening
119 First port column
120 Second port column
121 Control system
201 Prior art storage container vehicle
**201*a* Vehicle body of the storage container vehicle 201**
**201*b*** Drive means/wheel arrangement, first direction (X)
**201*c*** Drive means/wheel arrangement, second direction (Y)
301 Prior art cantilever storage container vehicle
**301*a* Vehicle body of the storage container vehicle 301**
**301*b*** Drive means in first direction (X)
**301*c*** Drive means in second direction (Y)
304 Gripping device
401 Prior art storage container vehicle
**401*a* Vehicle body of the storage container vehicle 401**
**401*b*** Drive means/wheel arrangement, first direction (X)
**401*c*** Drive means/wheel arrangement, second direction (Y)
X First direction
Y Second direction
Z Third direction
$X_i$, $Y_j$ Grid position on the rail system
$Z_k$ Vertical position
$Z_S$ Vertical position for speed change
501 Storage container handling vehicle
502 Lifting device
503 Storage container handling vehicle

The invention claimed is:

1. A method of determining a position of a container handling vehicle on a rail system of an automated grid-based storage and retrieval system, the automated grid-based storage and retrieval system comprising:

a framework structure comprising upright members and a rail system comprising a grid of horizontal rails provided at upper ends of the upright members, the framework structure defining a storage volume comprising storage columns arranged adjacent one another below the horizontal rails, the grid defining a plurality of grid positions;

a plurality of storage containers stacked on top of one another in the storage columns to form a plurality of stacks in the storage columns;

a container handling vehicle comprising a lifting device which can be lowered from the container handling vehicle for picking up a storage container;

a control system comprising records of, for each grid position comprising a stack of storage containers, a grid coordinate and a level of the storage containers in the stack of the storage column corresponding to that grid position;

wherein the method comprises:

for at least one grid position, determining a level of the storage containers in the stack by lowering a lifting device of a first container handling vehicle until a storage container is detected at a vertical position by the lifting device of the first container handling vehicle; and determining, using the control system, a grid position of the first container handling vehicle through matching the detected vertical position with a record of a grid position having the same level of storage containers in a stack.

2. The method of claim 1, wherein the method comprising determining the vertical position when the lifting device is holding a storage container.

3. The method of claim 1, wherein the method further comprises lowering the lifting device at a first speed until a first vertical position is reached, and lowering the lifting device at a second speed that is slower than the first speed when determining the level of the storage containers in the stack.

4. The method of claim 3, wherein the first vertical position is determined based on an expected maximum level of storage containers for an expected grid position.

5. The method of claim 1, further comprising instructing a second container handling vehicle to move storage containers from or to a grid position to create a unique level of storage containers at the grid position.

6. The method of claim 5, wherein the grid position of the first container handling vehicle is determined when the lifting device of the first container handling vehicle is lowered to detect the unique level of storage containers set by the second container handling vehicle.

7. The method of claim 1, further comprising updating the records of the control system with a determined grid position of the first container handling vehicle.

8. A system of determining a grid position of a container handling vehicle on a rail system of an automated grid-based storage and retrieval system, the automated grid-based storage and retrieval system comprising:

a framework structure comprising upright members and a rail system comprising a grid of horizontal rails provided at upper ends of the upright members, the framework structure defining a storage volume comprising storage columns arranged adjacent one another below the horizontal rails, the grid defining a plurality of grid positions;

a plurality of storage containers stacked on top of one another in the storage columns to form a plurality of stacks in the storage columns;

a plurality of container handling vehicles comprising a lifting device which can be lowered from the container handling vehicle for picking up a storage container;

a control system comprising records of, for each grid position comprising a stack of storage containers, a grid coordinate and a level of the storage containers in the stack of the storage column corresponding to that grid position;

wherein the system is adapted to:

for at least one grid position, determine a level of the storage containers in the stack by lowering a lifting device of a first container handling vehicle until a storage container is detected at a vertical position by the lifting device of the first container handling vehicle; and determining, using the control system, grid position of the first container handling vehicle through matching the detected vertical position with a record of a grid position having the same level of storage containers in a stack.

9. The system of claim 8, wherein the system is adapted to detect the vertical position when the lifting device is holding a storage container.

10. The system of claim 8, wherein the system is further adapted to lower the lifting device at a first speed until a first vertical position is reached, and lowering the lifting device at a second speed that is slower than the first speed when determining the level of the storage containers in the stack.

11. The system of claim 10, wherein the first vertical position is determined based on an expected maximum level of storage containers for an expected grid position.

12. The system of claim 8, wherein the control system is further adapted to instruct a second container handling vehicle to move storage containers from or to a grid position to create a unique level of storage containers at the grid position.

13. The system of claim 12, wherein the grid position of the first container handling vehicle is determined when the lifting device of the first container handling vehicle is lowered to detect the unique level of storage containers set by the second container handling vehicle.

14. The system of claim 8, wherein the control system is further adapted to update the records of the control system with the determined grid position of the first container handling vehicle.

15. A computer program product for a control system, wherein the computer program product comprises instructions that when performed on the control system causes the control system to perform a method of determining a position of a container handling vehicle on a rail system of an automated grid-based storage and retrieval system, the automated grid-based storage and retrieval system comprising:

a framework structure comprising upright members and a rail system comprising a grid of horizontal rails provided at upper ends of the upright members, the framework structure defining a storage volume comprising storage columns arranged adjacent one another below the horizontal rails, the grid defining a plurality of grid positions;

a plurality of storage containers stacked on top of one another in the storage columns to form a plurality of stacks in the storage columns;

a container handling vehicle comprising a lifting device which can be lowered from the container handling vehicle for picking up a storage container;

a control system comprising records of, for each grid position comprising a stack of storage containers, a grid coordinate and a level of the storage containers in the stack of the storage column corresponding to that grid position;

wherein the method comprises:

for at least one grid position, determining a level of the storage containers in the stack by lowering a lifting device of a first container handling vehicle until a storage container is detected at a vertical position by the lifting device of the first container handling vehicle; and determining, using the control system, a grid position of the first container handling vehicle through matching the detected vertical position with a record of a grid position having the same level of storage containers in a stack.

* * * * *